United States Patent
Murakami et al.

(10) Patent No.: US 7,510,317 B2
(45) Date of Patent: Mar. 31, 2009

(54) ILLUMINATING DEVICE FOR DISPLAY DEVICE

(75) Inventors: Yoshihiro Murakami, Matsusaka (JP); Satoshi Ono, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 13 days.

(21) Appl. No.: 11/142,797

(22) Filed: Jun. 1, 2005

(65) Prior Publication Data

US 2005/0281037 A1   Dec. 22, 2005

(30) Foreign Application Priority Data

Jun. 18, 2004   (JP) .............................. 2004-181370

(51) Int. Cl.
*F21V 7/04* (2006.01)
*F21V 19/00* (2006.01)

(52) U.S. Cl. .................. 362/634; 362/382; 362/614

(58) Field of Classification Search ................ 362/382, 362/182, 225, 217, 260, 249, 30, 29, 614, 362/396, 634; 248/906, 50; 439/527; 313/49; 174/138
See application file for complete search history.

(56) References Cited

U.S. PATENT DOCUMENTS

| | | | |
|---|---|---|---|
| 6,309,081 B1 * | 10/2001 | Furihata | 362/634 |
| 6,527,414 B2 * | 3/2003 | Moon | 362/249 |
| 6,641,281 B2 * | 11/2003 | Cheng | 362/217 |
| 6,897,912 B2 | 5/2005 | Kawakami et al. | |
| 6,974,221 B2 * | 12/2005 | Wu et al. | 362/29 |
| 7,059,736 B2 * | 6/2006 | Yu et al. | 362/97 |
| 2002/0008805 A1 | 1/2002 | Kawakami et al. | |
| 2003/0227767 A1 | 12/2003 | Lee et al. | |
| 2004/0012763 A1 * | 1/2004 | Yu et al. | 353/122 |
| 2004/0012971 A1 * | 1/2004 | Tsai et al. | 362/390 |
| 2004/0105044 A1 | 6/2004 | You | |
| 2004/0257792 A1 * | 12/2004 | Yu et al. | 362/31 |
| 2005/0152124 A1 * | 7/2005 | Tsai | 362/30 |
| 2005/0225960 A1 * | 10/2005 | Tsai | 362/23 |
| 2005/0225992 A1 * | 10/2005 | Idei et al. | 362/382 |
| 2006/0050500 A1 * | 3/2006 | Chang et al. | 362/29 |
| 2006/0158905 A1 * | 7/2006 | Lai et al. | 362/634 |

FOREIGN PATENT DOCUMENTS

| | | |
|---|---|---|
| CN | 1325036 A | 12/2001 |
| JP | 09-330613 | 12/1997 |
| JP | 10-207406 | 8/1998 |
| JP | 2001-210126 | 8/2001 |
| JP | 2001-266634 A | 9/2001 |
| JP | 2003-215581 A | 7/2003 |
| JP | 2003346541 A * | 12/2003 |
| JP | 2004-055531 | 2/2004 |
| WO | 03/100317 A1 | 12/2003 |

OTHER PUBLICATIONS

"Display Device Lighting Unit"; U.S. Appl. No. 11/033,153, filed Jan. 12, 2005.
Official communication issued in the counterpart Chinese Application No. 2005100773161, mailed on Jun. 22, 2007.
Translation of the official communication issued in the counterpart Chinese Application No. 2005100773161, mailed on Jun. 22, 2007.
Official communication issued in the counterpart Japanese Application No. 2004-181370, mailed on Jun. 19, 2007.

* cited by examiner

*Primary Examiner*—John A Ward
(74) *Attorney, Agent, or Firm*—Keating & Bennett, LLP

(57) ABSTRACT

An illuminating device for a display device includes a light source lamp and a lamp supporting member and has (1) a configuration in which the lamp supporting member has a fixing pin provided at a position other than a position substantially just under the light source lamp, (2) a configuration in which the lamp supporting member is formed of a reflective material, or (3) a configuration in which the above-mentioned configurations are combined.

8 Claims, 6 Drawing Sheets

ILLUMINATING DEVICE FOR DISPLAY DEVICE

REFERENCE TO RELATED APPLICATIONS

This Nonprovisional application claims priority under 35 U.S.C. § 119(a) from Patent Application No. 2004-181370 filed in Japan on Jun. 18, 2004, the entire contents of which are hereby incorporated in the present application by reference.

BACKGROUND OF THE INVENTION

1. Field of the Invention

The present invention relates to an illuminating device for a display device, a lamp supporting member, and a liquid crystal display device. More particularly, it relates to an illuminating device for a display device suitable for constituting a backlight of a transparent liquid crystal display device or a semi-transparent liquid crystal display device having a transparent region in a liquid crystal display element, a lamp supporting member which is used in the illuminating device for a display device, and a liquid crystal display device including the illuminating device for a display device.

2. Description of the Related Art

An illuminating device for a display device provides light to a device for displaying light and is widely used in a backlight part and the like in a liquid crystal display device, for example. That is, since a liquid crystal panel does not emit light by itself in the liquid crystal display device, the illuminating device for the display device is generally provided as the backlight part for emitting light to the liquid crystal panel in a transparent liquid crystal display device or a semi-transparent liquid crystal display device. Such a liquid crystal display device is indispensable for displaying information or screen images. High-quality products in which characteristics of the liquid crystal display such as low power consumption, lightweight, and thinness are sufficiently achieved have recently been utilized in display panels of consumer video monitors, industrial equipment monitors, Personal Digital Assistants and the like, and are widely applied to various fields.

As a backlight used in the liquid crystal display device, there are two types such as an edge light (side backlight) and a direct backlight.

As shown in FIG. 6, a structural characteristic of an edge light includes a bar-like light source 102 in a frame 103, such as a cold cathode fluorescent tube, disposed on a side surface of a transparent light guide plate 101. In this case, light from the light source 102 is made incident to the light guide plate 101 and is then outputted from the light guide plate 101 through an optical sheet 104 to the liquid crystal panel 105 by a frosting, a printing, or a prism and the like of the light guide plate 101. Thus, the liquid crystal display device may become thinner, but an increase in the number of the light sources 102 to increase the luminance has a direct influence on the thickness of a module. In addition, since a heavy continuum such as an acrylic compound is used for the light guide plate 101, the larger the liquid crystal display device becomes beyond a 20-inch model, the heavier the model becomes using the liquid crystal displace device.

As shown in FIG. 7, in the case of a direct backlight, a plurality of bar-like light sources 113, such as cold cathode fluorescent tubes, are provided on the back surface of a display element 117 such as a liquid crystal panel. In this case, light from the bar-like light sources 113 is almost directly incident to the display element 117, and in many cases a diffuser 115 is provided between the display element 117 and the bar-like light source 113 in order to diffuse the images of the bar-like light source 113. Additionally, 118 indicates a frame, 116 optical sheets, 114 a lamp frame, 112 a highly reflective resin, and 111 a backlight frame. Thus, many light sources 113 can be arranged to increase the amount of light, and light loss is small because the light is directly incident to the display element 117, and a large size beyond 20-inch models can be easily achieved. However, the number of parts is increased because of the large number of the light sources 113, and a circuit for driving the light sources 113 also becomes large. In addition, power consumption and the total amount of generated heat is increased.

Such liquid crystal displays are advanced in the field of small-sized display elements, and advances in the market for displays in laptop personal computers (PC) and mobile phones have been developed. In these fields, the display size is mainly below a 15-inch model and a slim shape is indispensable, so that the edge light is selected in view of merchantability.

Presently, liquid crystal display devices have been dramatically enlarged because of the completion of a process using a larger mother glass, so that the liquid crystal display devices may be used in televisions (20-inch models to 50-inch models) for home use. In such televisions, brightness becomes more important as a basic performance characteristic than in PCs and mobile phones. For example, while a luminance specification is generally about 250 candela (cd/m$^2$) in PC monitors, the luminance specification must be 500 candela (cd/m$^2$) or more for televisions. In this respect, the direct backlight is preferable in order to provide a large backlight having a high luminance.

In an illuminating device for a display device which may be used in a conventional liquid crystal display device and the like, there is a lamp holder which is formed in a segmented gripping shape having an opening in one portion and made of a flexible transparent material (see, for example, pages 1-2 and 4 in Japanese Kokai Publication 2001-210126); a backlight assembly including a plurality of lamps having sub lamps, and a lamp holder for housing a connection part via which the sub lamps are connected to each other (see, for example, pages 1-2, 7, and 13 in Japanese Kokai Publication 2004-55531); a backlight device in which a reflector for condensing light emitted from a light source in a light guide plate is formed of metal and supports the light source (see, for example, pages 1-2 in Japanese Kokai Patent Publication Hei-10-207406); a fluorescent lamp unit in which a fluorescent lamp is housed in a trough-shaped unit support, and a lamp support including a translucent or light reflective synthetic resin arranged between the fluorescent lamp and the unit support (see, for example, pages 1-2 in Japanese Kokai Patent Publication Hei-09-330613). In addition, US 2003/0227767 A1 is incorporated by Japanese Kokai Publication 2004-55531 by reference.

According to the conventional lamp holder, since a pin for fixing the lamp holder is provided just under a fluorescent tube, light from the fluorescent tube leaks through the pin, which results in a reduction of the luminance at that portion (see, for example, FIG. 2 of Japanese Kokai Patent Publication 2001-210126). Also, in a configuration in which the lamp holder is bonded to a base bottom surface by a bonding projection and a bonding groove, light leaks from the bonding projection provided just under the lamp (see, for example, FIG. 5 of Japanese Kokai Patent Publication 2004-55531). In these devices, a lower luminance and an uneven luminance are created due to the structure of the lamp holder. For example, when the amount of light is small at the time of carrying out gradation of the display or starting the display, the uneven luminance is likely to become conspicuous, and therefore an improvement in this field is needed. Especially in the field of liquid crystal displays, since a large illuminating device having high luminance and low cost is needed in order to improve the merchantability, it is necessary to provide a product having high quality and high merchantability by reducing the influence of the lamp holder on the luminance and preventing a reduction of the display quality. Therefore, there is room for improvement to reduce uneven luminance occurring due to the structure of the lamp holder in the illuminating device for a display device in which high quality is needed.

SUMMARY OF THE INVENTION

The present invention was made in view of the above problems, and it is an object of the present invention to provide an illuminating device for a display device in which uneven luminance on an information display surface is prevented by securing a position accuracy of a light source lamp, light leakage from a lamp supporting member, lower luminance or uneven luminance is reduced, and excellent display quality may be provided, a lamp supporting member, and a liquid crystal display device including the illuminating device for a display device.

While the inventors of the present invention have studied various kinds of illuminating devices for display devices which may be preferably applied to a backlight and the like of the liquid crystal display device and may implement a large backlight having high luminance, they focused on a constitution in which a light source lamp is supported by a lamp supporting member and fixed to a backlight frame to be mounted on the device. For example, a constitution which is formed in a segmented gripping shape having an opening in one part and made of a transparent material having flexibility as shown in FIG. 5A. In this case, it is found that since the fixing pin 12 is provided just under a structural part 13 for gripping the light source lamp 21, and the fixing pin 12 is inserted into holes of the reflector 112 and the backlight frame 111 to fix the light source lamp 21, light from the light source lamp 21 leaks from (1) the pin part and (2) a gap between the pin part and the hole, which adversely affects the display quality. That is, when the lower part (the part for fixing the lamp supporting member in the display by engaging with the backlight frame) is provided substantially just under the upper part of the lamp supporting member 11 (the part for gripping the light source lamp), a dark area caused by the light leakage from the position of the fixing pin is observed as shown in FIG. 5B, which causes the display quality to be lowered by the influence of the uneven luminance because of the light leakage.

Thus, for example, when the fixing pin 12 of the lamp supporting member 11 is provided at a position other than a position just under the light source lamp 21, it is found that the light source lamp 21 is protected, uneven luminance on the information display surface is prevented by securing the precision of the position of the light source lamp 21, a level of the dark area caused by the light leaking due to the structure of the lamp supporting member 11 is decreased, the influence of the uneven luminance is sufficiently reduced, and preferable display quality is provided, so that the above problems can be admirably solved. In addition, when the lamp supporting member 11 is formed of a reflective material, that is, when the reflecting coefficient of the lamp supporting member 11 is increased by providing a reflecting coating on the lamp supporting member 11 or forming the lamp supporting member 11 from a highly reflective material, it is found that the operation and effects of the present invention can be sufficiently provided, and thereby attain the present invention.

That is, the present invention provides an illuminating device for a display device, the illuminating device including a light source lamp and a lamp supporting member, wherein the lamp supporting member includes a fixing pin provided at a position other than a position substantially just under the light source lamp.

In addition, embodiments of the present invention provide an illuminating device for a display device, the illuminating device including a light source lamp and a lamp supporting member, wherein the lamp supporting member is formed of a reflective material.

DETAILED DESCRIPTION OF THE PREFERRED EMBODIMENTS

An illuminating device for a display device of the present invention includes a light source lamp and a lamp supporting member, wherein the illuminating device is suitable for a liquid crystal display device. According to the present invention, the illuminating device is preferably used as a direct backlight. In addition, the illuminating device may be used as an edge light (side backlight). The lamp supporting member may also be referred to as a lamp holder.

As the illuminating device, in the case of the direct backlight, there is a configuration in which the light source lamp is provided on a reflector through the lamp supporting member. In this constitution, one or more light source lamps are used, and it is preferable that the present invention is applied to the constitution in which a plurality of light source lamps are used.

In addition, in the case of the edge light, there is a configuration in which the light source lamp is provided on one or more side surfaces of a transparent light guide plate formed of resin through the lamp supporting member.

The illuminating device according to the present invention may include other component members as long as these necessary component members are provided.

When the illuminating device is used in the liquid crystal display device, the light source lamp is provided on a reflector in general, and various kinds of optical sheets such as a diffuser, a diffusion sheet, a condenser lens, a polarized light selective reflection/transmission sheet, a protection/diffusion sheet and an electromagnetic wave shielding sheet (conductive sheet, ITO sheet) and the like are laminated and provided thereon to constitute the illuminating device, which constitutes the liquid crystal display device together with a liquid crystal panel.

The illuminating device for a display device of the present invention has (1) a configuration in which the lamp supporting member includes a fixing pin provided at a position other than a position substantially just under the light source lamp, and (2) a configuration in which the lamp supporting member is formed of a reflective material, or a configuration in which the above-mentioned configurations are combined.

In case that the illuminating device has the configuration (1), the fixing pin which engages with the backlight frame and the like, is provided at a position other than a position substantially just under the light source lamp in the lamp supporting member, so the amount of light leaking through the fixing pin may be reduced and generation of a dark area on the display surface may be prevented. In particular, in the case of a large backlight requiring high luminance it is important to reduce such a dark area.

Figure 1:
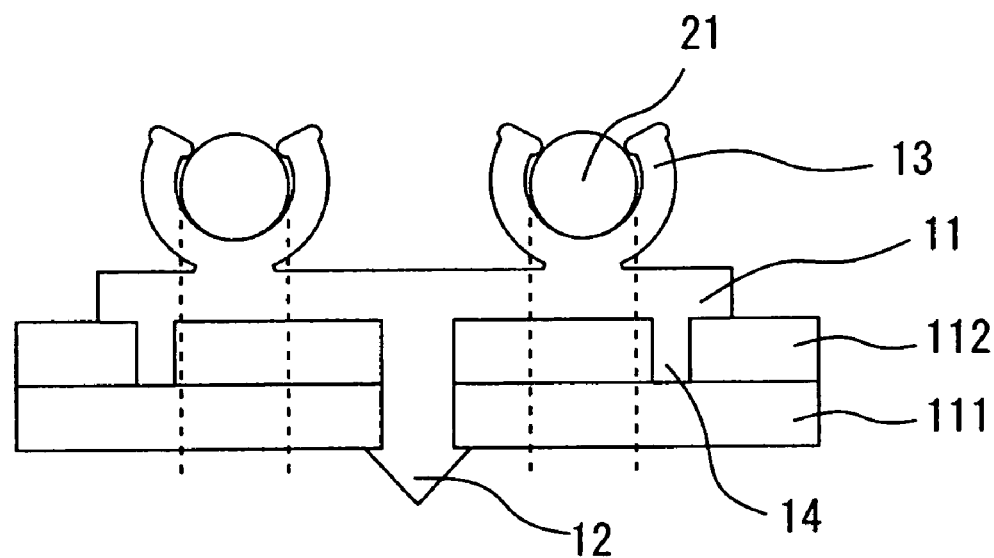
FIG. 1 is a conceptual sectional view showing one embodiment of a lamp supporting member in an illuminating device for a display device according to the present invention. That is, a lamp supporting member is provided having a configuration in which a plurality of structural parts for gripping a light source lamp are integrally provided, a fixing pin is provided in the middle position thereof, and a pin for controlling a position of the lamp supporting member is provided.

The position of the fixing pin may be any place, as long as the position is a position other than the position just under the light source lamp and the operation and effect of the present invention such that light leakage is reduced and influence of the unevenness of luminance is reduced may be exhibited. The fixing pin is preferably provided apart from the position just under the light source lamp. For example, as shown in FIG. 1, when a plurality of the light source lamps 21 are gripped by one lamp supporting member 11, the fixing pin 12 is preferably provided at a position other than the position corresponding to a place between both sides of the light source lamp 21 shown by dotted lines in a conceptual sectional view showing the lamp supporting member 11 for gripping the light source lamp 21.

According to the present invention, a lamp supporting member (lamp supporting member for one tube) having a constitution in which one lamp supporting member has one part 13 for gripping a light source lamp, or a lamp supporting member (lamp supporting member for many tubes) having a constitution in which one lamp supporting member has a plurality of parts 13 for gripping the light source lamp may be used.

The present invention may be a lamp supporting member for one tube having the configuration in which the lamp supporting member and the fixing pin are provided for each light source lamp independently, or a lamp supporting member for many tubes having the configuration in which the lamp supporting member has a plurality of parts for gripping the light source lamp. When two or more parts for gripping a light source lamp are integrated, the number of parts may be reduced, and a distance between the parts for gripping the light source lamp may be constant. Therefore the light source lamps may be easily supported at regular intervals with high precision, which enables low-cost manufacturing of the display device having a high display quality. In this case, there is a configuration in which a plurality of straight-line portions of the light source lamp are supported by the integrated parts for gripping the light source lamp, and a configuration in which a plurality of curved-line portions of the light source lamp are supported by the integrated parts for gripping the light source lamp when the light source lamp has the curved-line portions.

As a preferable configuration of the present invention, there is (a) a configuration in which the lamp supporting member has a plurality of structural parts for gripping the light source lamp and the fixing pin is provided substantially in the middle position thereof (a configuration in which a plurality of the lamp supporting members are integrated and the fixing pin is provided substantially in the middle position thereof), (b) a configuration in which the lamp supporting member has a pin for controlling a position of the lamp supporting member, (c) a configuration in which the lamp supporting member includes a fixing pin having an angular shape, (d) a configuration in which the fixing pin has a cross section in an oblique direction to the planar shape of the lamp supporting member as viewed in a plane (a configuration in which the fixing pin is provided in an oblique direction with respect to the lamp supporting member), and (e) a configuration in which the fixing pin is provided substantially just under a pin for supporting a diffuser.

The lamp supporting member may be constituted by appropriately combining the configurations of (a) to (e).

According to the configuration (a), the fixing pin is provided substantially in the middle position between the light source lamps in the lamp supporting member having a plurality of structural parts for gripping the light source lamps.

Thus, since a distance between the light source lamp and the fixing pin may be almost constant, uneven luminance may be effectively further reduced and the light source lamp may be supported in a balanced manner. According to the configuration (a), the fixing pin is provided substantially in the middle position between the light source lamps, and it may be provided just in the middle position between the light source lamps or be provided in the position close to either one of the light source lamps as long as the distance between the light source lamp and the fixing pin is almost constant.

The number and the shape of the fixing pins provided in one lamp supporting member are not particularly limited in the present invention.

Figure 2A:
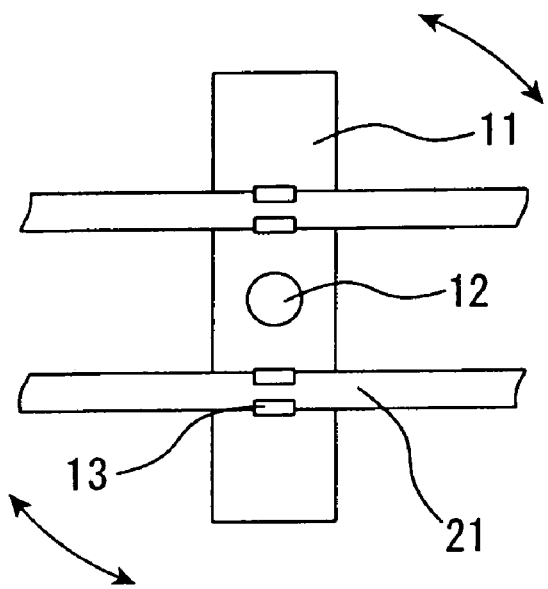
FIG. 2A is a conceptual plan view (viewed from above) showing one embodiment of the lamp supporting member in an illuminating device for a display device according to the present invention, that is, a lamp supporting member having a configuration in which a plurality of structural parts for gripping a light source lamp are integrally provided and a round fixing pin is provided in the middle position thereof.
Figure 2B:
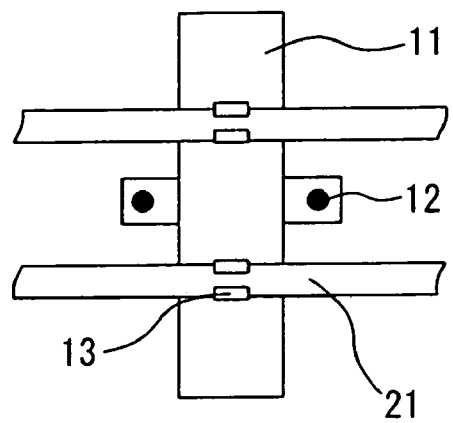
FIG. 2B is a conceptual plan view (viewed from above) showing one embodiment of a lamp supporting member in an illuminating device for a display device according to the present invention, that is, a lamp supporting member having a configuration in which a plurality of structural parts for gripping a light source lamp are integrally provided and a member having a fixing pin is provided in the middle position thereof.

In the case of the lamp supporting members including two integrated structural parts for gripping the light source lamp and one fixing pin, as shown in FIG. 2A, the light source lamp 21 may be shifted in the direction shown by the arrows and the precision of the position precision may be insufficiently secured. But, in the case of the lamp supporting members including two integrated structural parts for gripping the light source lamp and two or more fixing pins provided substantially in the middle position of the structure as shown in FIG. 2B, the precision of the position may be sufficiently secured.

According to the configurations (b), (c), (d), and (e), since means for securing the precision of the position of the light source lamp is provided, uneven luminance caused by a displacement may be sufficiently prevented.

According to the configuration (b), the pin for controlling a position is provided in order to prevent displacement of the lamp supporting member. The number and the position of the pins for controlling a position of the lamp supporting member, and the shape thereof, are not particularly limited. The pin for controlling a position of the lamp supporting member preferably has a structure in which light does not leak from the pin for controlling a position of the lamp supporting member. For example, as shown in FIG. 1, the structure may be such that the pin 14 for controlling a position of the lamp supporting member is provided at one side or both sides of the lamp supporting member 11 and engaged with a hole provided in the reflector 112 so as not to protrude into the backlight frame 111. Thus, a stable display may be provided in which displacement of the light source lamp 21 may be controlled and light is prevented from leaking.

According to the configuration (c), since the fixing pin has an angular shape, displacement of the light source lamp may be further prevented as compared with the case where the fixing pin has a round shape. As the angular shape, there may be a rectangle, a square and the like.

In addition, according to the configuration (d), since the fixing pin has a cross section in an oblique direction to the planar shape of the lamp supporting member as viewed in a plane, displacement is not likely to occur as compared with the case where the fixing pin has a cross section in the same direction to the planar shape of the lamp supporting member as viewed in a plane. The fixing pin is provided so as to be parallel to the light source lamp in general, but in this case, the fixing pin is provided in the oblique direction with respect to a mounting direction of the light source lamp.

Figure 2C:
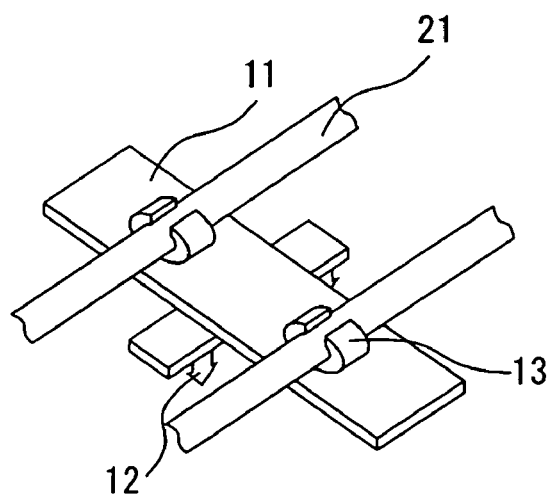
FIG. 2C is a perspective view showing the lamp supporting member in FIG. 2B.
Figure 2D:
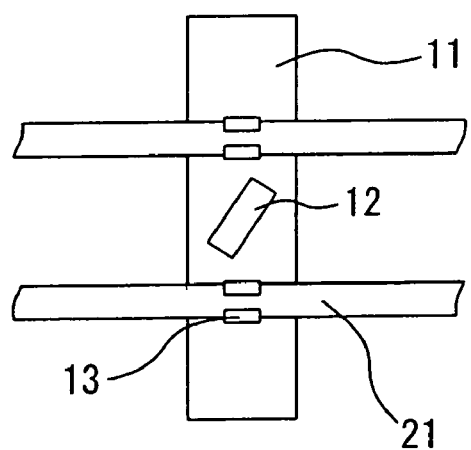
FIG. 2D is a conceptual plan view (viewed from above) showing one embodiment of a lamp supporting member in an illuminating device for a display device according to the present invention, that is, a lamp supporting member having a configuration in which a plurality of structural parts for gripping a light source lamp are integrally provided, and a rectangular fixing pin has a cross section in an oblique direction to the planar shape of the lamp supporting member as viewed in a plane in the middle position thereof.

In FIG. 2A, shown is the above-mentioned configuration in which one lamp supporting member 11 includes a plurality of structural parts 13 for gripping the light source lamps 21 and one fixing pin 12 is provided in the middle position thereof, and the fixing pin 12 has a round shape. In this case, the lamp supporting member 11 may be shifted in the direction shown by the arrows, but when the fixing pin 12 has a shape of a rectangle and the fixing pin 12 has a cross section in an oblique direction to the planar shape of the lamp supporting member 11 as viewed in a plane as shown in FIG. 2D, displacement of the lamp supporting member 11 may be sufficiently prevented.

Figure 3:
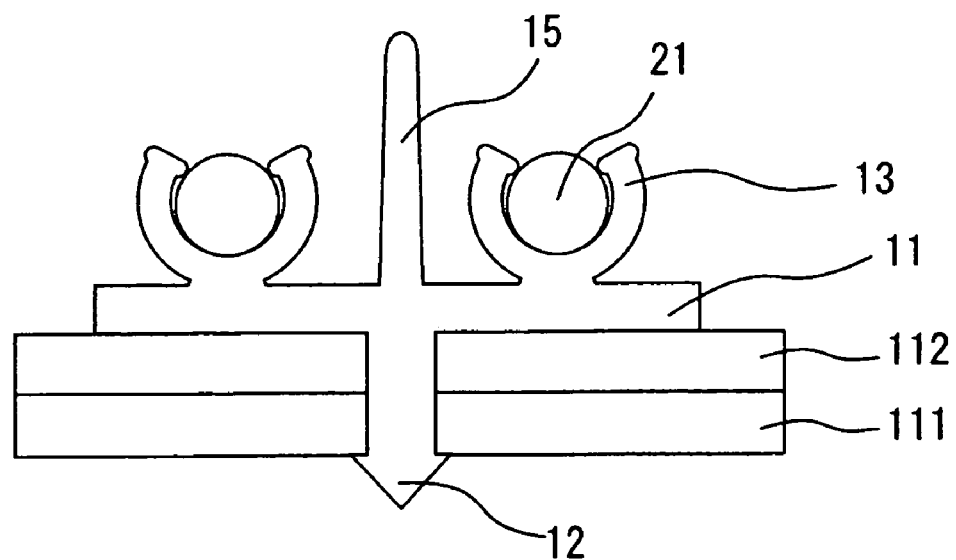
FIG. 3 is a conceptual sectional view (viewed from above) showing one embodiment of a lamp supporting member in an illuminating device for a display device according to the present invention, that is, a lamp supporting member having a configuration in which a plurality of structural parts for gripping a light source lamp are integrally provided and a fixing pin and a pin for supporting a diffuser are provided in the middle position thereof.

According to the configuration (e), as shown in FIG. 3, the fixing pin 12 is provided substantially just under the pin 15 for supporting a diffuser. Thus, light leakage from the fixing pin 12 may be further reduced by the reflection at the pin 15 for supporting a diffuser. According to the illuminating device for a display device in general, a diffuser is provided on the side to which light from the light source lamp is outputted mainly in order to diffuse the light to become uniform; and the reflector, the light source lamp, and the diffuser are arranged in this order toward the side to which the light is outputted. In this case, the pin for supporting the diffuser is provided on the reflector in order to keep the distance between the reflector and the diffuser by supporting the diffuser and the like from beneath, and to prevent a reduction of the display quality in the display caused by flexure of the diffuser and the like. According to the present invention, in view of the reduction in the number of parts, it is preferable that the pin for supporting the diffuser is integrally provided in the lamp supporting member, and in this case, the pin for supporting the diffuser is provided on an upper side (diffuser side) of the lamp supporting member and the fixing pin is provided on a lower side (reflector side). As the shape of the pin for supporting a diffuser, there is a conical shape and the like.

Figure 5A:
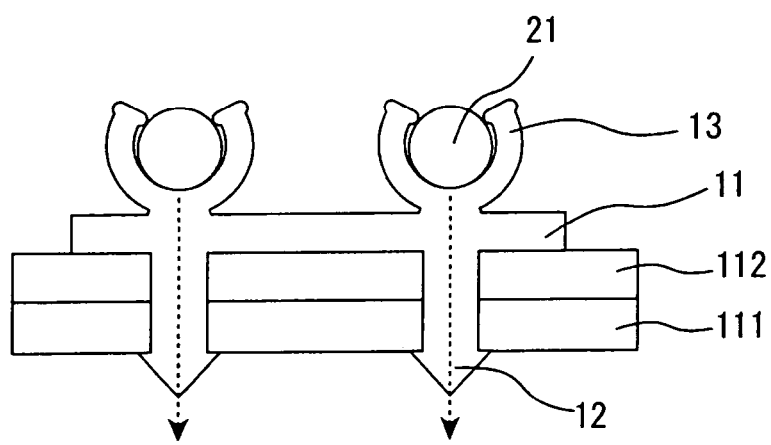
FIG. 5A is a conceptual sectional view showing an illuminating device for a display device having a configuration in which a lamp fixing pin is provided just under a structural part for gripping a light source lamp.
Figure 5B:
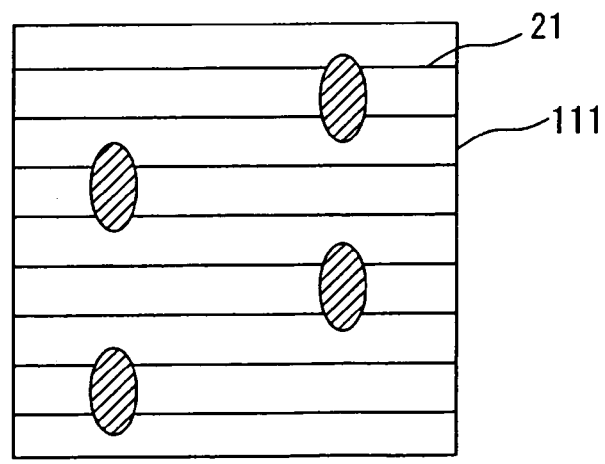
FIG. 5B is a conceptual plan view showing dark areas (shadow areas) caused by light leakage from positions of the fixing pins in the configuration shown in FIG. 5A.
Figure 5C:
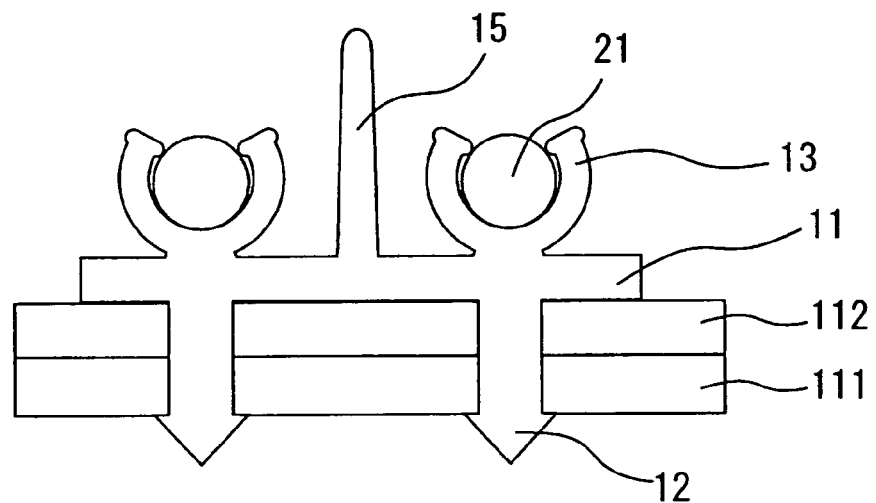
FIG. 5C is a conceptual sectional view showing an illuminating device for a display device having a configuration in which a fixing pin is provided just under a structural part for gripping a light source lamp and a pin for supporting a diffuser is provided.
Figure 6:
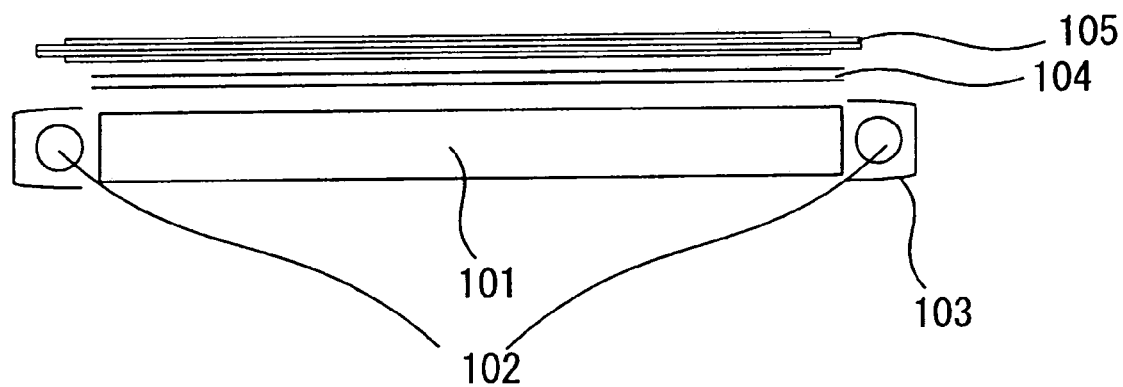
FIG. 6 is a schematic sectional view showing an essential portion of the structure of an edge light (side backlight).
Figure 7:
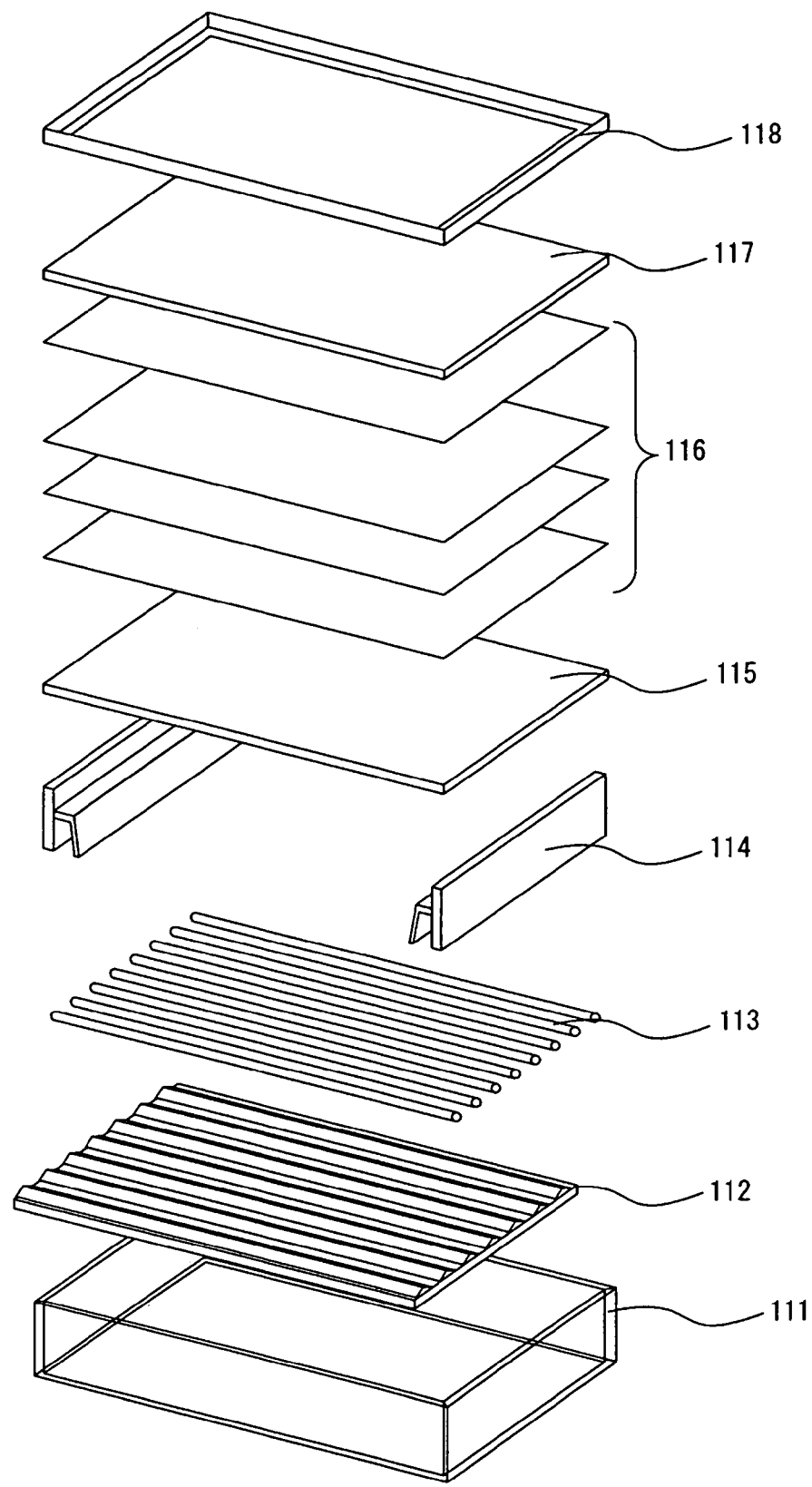
FIG. 7 is an exploded perspective schematic view showing an essential portion of the structure of a direct backlight.

In FIG. 5C, the fixing pins 12 are provided just under the structural parts 13 for gripping the light source lamps 21 and the pin 15 for supporting a diffuser is provided in the middle position of the two light source lamps 21 in general. But, as shown in FIG. 3, when the fixing pin 12 is provided substantially just under the pin 15 for supporting a diffuser, the light leakage from the fixing pin 12 provided under the pin 15 for supporting a diffuser may be prevented by reflection of the pin 15 for supporting a diffuser. A positional relation between the fixing pin and the pin for supporting a diffuser may be such that one part or all of the connection parts (a range in which the fixing pin is provided) between the fixing pin and the lamp supporting member body is provided just under one part or all of the connection parts (a range in which the pin for supporting a diffuser is provided) between the pin for supporting a diffuser and the lamp supporting member body.

According to the configuration of the illuminating device of the present invention, the lamp supporting member may be provided in a display region or in a non-display region, and when it is provided in the display region, the lamp supporting member may be white or transparent. In addition, when the pin for supporting a diffuser is provided in the lamp supporting member, the pin for supporting a diffuser may be white or transparent.

In the case of the configuration (2), that is, when the lamp supporting member is formed of a reflective material, a reflective coefficient of the lamp supporting member may be increased by coating the lamp supporting member with the reflective material or forming the lamp supporting member with the reflective material. In this case, it is preferable that the lamp supporting member is white. Thus, the operation and effects of the present invention in which the light leakage from the part of the fixing pin may be sufficiently prevented.

When the lamp supporting member is coated with a reflective material, the reflective coating material having a reflectivity higher than that of the normally used material for the lamp supporting member is applied onto the lamp supporting member to form a coating film on the lamp supporting member. The kind of the reflective coating and the condition for coating the lamp supporting member are not particularly limited. In addition, when the lamp supporting member is formed of a reflective material, the material having a reflectivity higher than that of the normally used material for the lamp supporting member is used to form the lamp supporting member. The kind of the highly reflective material to form the lamp supporting member, and the condition and the like for forming the lamp supporting member from the material are not particularly limited.

According to the illuminating device for a display device of the present invention, as the light source lamp, preferred are fluorescent tubes such as a cold cathode fluorescent tube, a hot cathode fluorescent tube, and the like. As the light source lamp having a curved-line portion, a U-shaped tube light source lamp, an S-shaped tube light source lamp, a W-shaped tube light source lamp and the like may be used. When such a light source lamp is used, the number of parts is reduced and the total number of the electrodes of the light source lamp may be reduced. Therefore, the whole power consumption of the illuminating device may be reduced. Among these, the U-shaped tube is preferable because a reduction in the manufacturing yield of the light source lamp is prevented and a reduction in power consumption may be achieved. Furthermore, when the U-shaped tube or the like is used, since the electrodes of the light source lamp may be collected to one side thereof, drive circuits may be collected to the one side. Additionally, when the S-shaped tube or the like is used, since the electrodes of the light source lamp are provided on both sides thereof, the optical characteristics of light from the light source lamp are uniform.

The arrangement configuration of the light source lamp preferably has a configuration in which the straight-line portions of the light source lamp are parallel to each other and arranged at a regular interval to achieve uniform light.

The lamp supporting member is preferably formed of an insulating resin. In addition, only one part of the lamp supporting member may be formed of an insulating resin as long as the light source lamp is insulated from the base on which the light source lamp is positioned. As the insulating resin, an elastic material such as a rubber material is preferable. In this case, a problem caused by low impact resistance of the light source lamp may be sufficiently solved. In addition, the insulating resin preferably has flexibility.

Figure 4A:
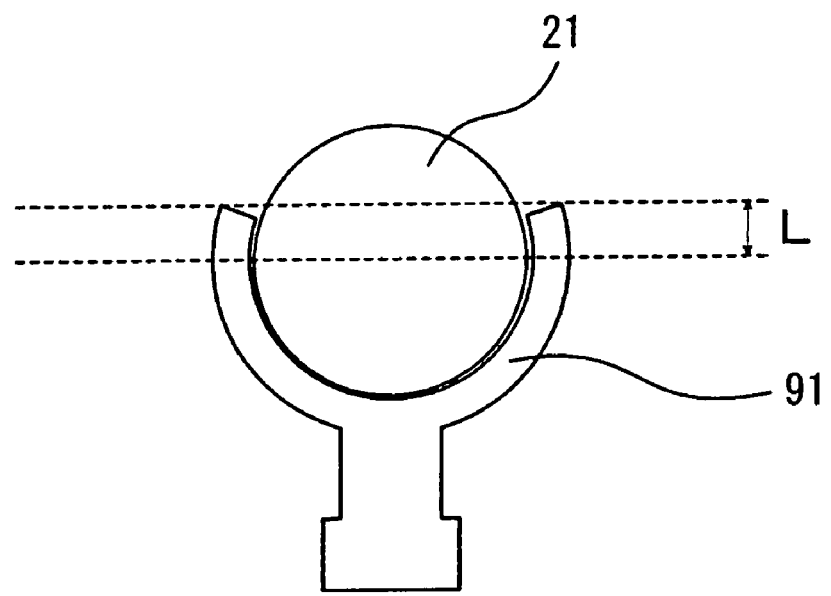
FIG. 4A is an explanatory view showing a range L of an upper part of a light source lamp supported by a lamp supporting member.
Figure 4B:
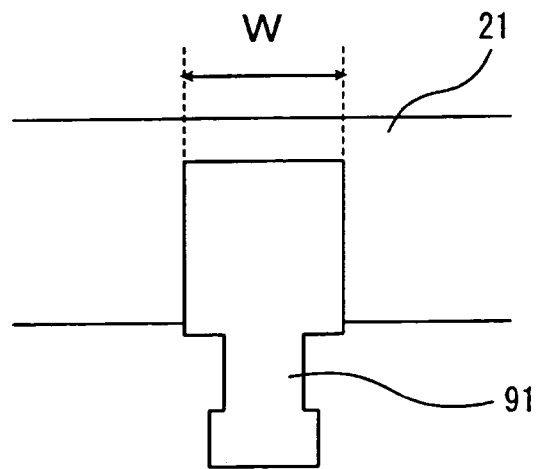
FIG. 4B is an explanatory view showing a length W of a lamp supporting member in a direction of a light source lamp.

Furthermore, it is preferable that the lamp supporting member has a notch, that is, the light source lamp is supported by the lamp supporting member having a segmented gripping shape having an opening in one part. Thus, the light source lamp may be mounted after the lamp supporting member is fixed. In this case, the lamp supporting member preferably supports the light source lamp up to the upper part as shown in FIG. 4A. That is, it is preferable that a range L of the upper part of the light source lamp 21 supported by the lamp supporting member 91 is more than 0 mm. And, as shown in FIG. 4B, it is preferable that a length W of the lamp supporting member 91 in the length direction of the light source lamp 21 is not more than 10 mm. These configurations provide sufficient strength to support the light source lamp, and enables the prevention of light loss and effective use of the light.

In addition, the lamp supporting member is preferably provided at least at one end part of the light source lamp in order to sufficiently fix the light source lamp, and more preferably provided at a place other than the end part in addition to the end part in order to appropriately support the light source lamp. The lamp supporting members provided at each position may have different shapes and may be formed of different materials, or may have the same shapes and may be formed of the same material.

The present invention also relates to a lamp supporting member used in an illuminating device for a display device. The lamp supporting member is useful as apart which constitutes the illuminating device for a display device and more particularly, the illuminating device for a display device suitable for constituting a backlight of a transparent liquid crystal display device or a semi-transparent liquid crystal display device having a transparent region in a liquid crystal element.

Furthermore, the present invention relates to a liquid crystal display device including an illuminating device for a display device. According to the liquid crystal display device, the operation and effects of the improvement in display quality may be provided by the prevention of a lower luminance or uneven luminance. When lamp supporting member has a plurality of structural parts for gripping the light source lamp, the liquid crystal display device may be effectively used for a display panel of a consumer video monitor, an industrial equipment monitor, and a Personal Digital Assistant as a transparent liquid crystal display or a semi-transparent liquid crystal display in which the number of parts is reduced, assembly variation in manufacturing steps is prevented, impact resistance is improved, and power consumption is reduced.

Since the illuminating device for a display device and the lamp supporting member of the present invention have the above-mentioned constitutions, uneven luminance on the information display surface may be prevented by securing the precision of the position of the light source lamp, light leakage caused by the structure of the lamp supporting member is reduced, and the influence of lower luminance or the uneven luminance is reduced, so that excellent display quality may be provided. Especially, the illuminating device for a display device and the lamp supporting member of the present invention is suitable for the illuminating device which constitutes the backlight of the transparent liquid crystal display device or the semi-transparent liquid crystal display device having the transparent region in the liquid crystal element. In addition, according to the liquid crystal display including the illuminating device for a display device of the present invention, the operation and effects such as an improvement in display quality may be provided by the prevention of a lower luminance or uneven luminance, the number of parts is reduced, assembly fluctuation in manufacturing steps is prevented, impact resistance is improved, and power consumption is reduced, which is effective for various kinds of monitors and display panels.

The preferred configurations of the illuminating device for a display device according to the present invention will, hereinafter, be described in more detail with reference to drawings based on the following embodiments, but the present invention is not limited to the embodiments and the embodiments may be combined, for example.

Embodiment 1

In a liquid crystal display device having an illuminating device behind a liquid crystal display element, a white lamp supporting member which has a configuration for being able to support a fluorescent tube and is formed of insulating resin is provided on a highly reflective resin of a display region, whereby the illuminating device in which the fluorescent tubes are arranged in parallel and equally spaced is provided. In FIG. 1, the lamp supporting member 11 has two structural parts 13 for gripping the light source lamps 21 and the fixing pin 12 is provided in the middle position thereof so that the fixing pin 12 is provided apart from a position just under the light source lamps 21. In this case, the pin 14 for controlling a position of the lamp supporting member 11 is provided at one or both ends of the lamp supporting member 11.

According to this constitution, a defect caused by light leakage may be prevented, and displacement of the lamp may be controlled. Also since the lamp supporting member has a plurality of structural parts for gripping a light source lamp, the number of parts may be reduced. Therefore, a stable liquid crystal module having excellent display quality may be provided at a low cost.

In this embodiment and the following embodiments, the shape, material, the number, and a position of the lamp supporting member made of insulating resin is not limited as long as a particular requirement of the present invention is satisfied. In addition, the liquid crystal display device may include either a direct backlight or an edge light (side backlight) having a U-shaped lamp or an even number of U-shaped lamps.

In addition, as a direct type of a liquid crystal display device including the illuminating device for a display device of the present invention, there is a liquid crystal display device having a structure in which the highly reflective resin is arranged on the metal sheet, the U-shaped tube having an end part and the like covered with the insulating resin is arranged on the highly reflective resin by the storage frame (lamp frame), the diffuser, several kinds of sheets such as a diffusion sheet, a condenser lens, a polarized light selective reflection/transmission sheet, a protection/diffusion sheet and an electromagnetic wave shielding sheet (conductive sheet, ITO sheet), the liquid crystal panel element, the frame and the like are arranged on the diffuser.

Embodiment 2

Similar to Embodiment 1, a display region of an illuminating device is constituted using a lamp supporting member. FIGS. 2A to 2D show the lamp supporting member 11 having two structural parts 13 for gripping the light source lamps 21 and the fixing pin 12 provided in the middle position thereof. In FIG. 2A, the fixing pin 12 has a round shape. In FIG. 2B, the fixing pins 12 have a round shape and a member having two or more fixing pins 12 is provided in the middle position of the lamp supporting member 11, whereby the lamp supporting member 11 is fixed. FIG. 2C is a perspective view showing the lamp supporting member in FIG. 2B. In FIG. 2D, the fixing pin 12 has a rectangular shape and the length direction of the rectangular shape is in an oblique direction to the length direction of the light source lamp 21.

According to these constitutions, a defect caused by light leakage may be prevented, and since the structural parts of the lamp supporting member grip the light source lamp, the number of parts may be reduced. Therefore, a stable liquid crystal module having an excellent display quality may be provided at low cost.

According to the configurations shown in FIGS. 2B to 2D, displacement of the light source lamp may be more sufficiently prevented as compared with the configuration in FIG. 2A, so that a position accuracy of the light source lamp may be sufficiently secured.

Embodiment 3

Similar to Embodiment 1, a display region of an illuminating device is constituted by a lamp supporting member. As shown in FIG. 3, the lamp supporting member 11 has two structural parts 13 for gripping the light source lamps 21 and has the fixing pin 12 and the pin 15 for supporting a diffuser in the middle position thereof. In this case, the fixing pin 12 is arranged just under the pin 15 for supporting a diffuser.

According to this constitution, the fixing pin is provided apart from a position just under the light source lamp, and light leakage from the fixing pin may be further reduced by reflection of the pin for supporting a diffuser. Also since the structural parts of the lamp supporting member grip the light source lamp, the number of parts may be reduced, therefore a stable liquid module having excellent display quality may be provided at low cost.

The invention claimed is:

1. An illuminating device for a display device, the illuminating device comprising:
    at least first and second light source lamp portions, a lamp supporting member, and a frame arranged to mount the lamp supporting member; wherein
    the lamp supporting member includes a fixing pin and at least first and second parts arranged to grip the at least first and second light source lamp portions, respectively;
    the fixing pin penetrates the frame and is provided at a position at a midpoint between the first and second parts arranged to grip the at least first and second light source lamp portions;
    the fixing pin is not located under either of the first and second light source lamp portions;
    the first light source lamp portion is a major portion of a first circular cross-section of the light source lamp;
    the second light source lamp portion is a major portion of a second circular cross-section of the light source lamp that is different from and spaced away from the first light source lamp portion;
    the lamp supporting member further includes first and second pins arranged to control a position of the lamp supporting member; and
    the first and second pins do not penetrate the frame;
    the first part arranged to grip the first light source lamp portion is positioned between the fixing pin and the first pin; and
    the second part arranged to grip the second light source lamp portion is positioned between the fixing pin and the second pin.

2. The illuminating device for a display device according to claim 1,
    wherein the fixing pin has an angular shape in an interlocking portion with a hole in the frame.

3. The illuminating device for a display device according to claim 1,
    wherein, in a planar view, the fixing pin extends in an oblique direction with respect to a longitudinal direction of the lamp at one of the at least first and second light source lamp portions.

4. The illuminating device for a display device according to claim 1,
    wherein the lamp supporting member includes a pin for supporting a diffuser provided substantially just above the fixing pin.

5. A liquid crystal display device comprising the illuminating device for a display device according to claim 1.

6. The illuminating device for a display device according to claim 1,
    wherein the lamp supporting member is white.

7. The illuminating device for a display device according to claim 1,
    wherein the lamp supporting member is formed of an insulating resin having a reflecting surface.

8. The illuminating device for a display device according to claim 1,
    wherein the lamp supporting member includes a plurality of said fixing pins, and
    the plurality of said fixing pins are provided parallel or substantially parallel to one of the at least first and second light source lamp portions.

* * * * *